United States Patent
Dahmer et al.

(10) Patent No.: US 8,511,992 B2
(45) Date of Patent: Aug. 20, 2013

(54) MINIMIZATION OF FOULING AND FLUID LOSSES IN TURBINE AIRFOILS

(75) Inventors: Matthew T. Dahmer, Milford, MA (US); Alexander V. Staroselsky, Avon, CT (US)

(73) Assignee: United Technologies Corporation, Hartford, CT (US)

( * ) Notice: Subject to any disclaimer, the term of this patent is extended or adjusted under 35 U.S.C. 154(b) by 1076 days.

(21) Appl. No.: 12/009,714

(22) Filed: Jan. 22, 2008

(65) Prior Publication Data

US 2009/0297361 A1 Dec. 3, 2009

(51) Int. Cl.
*F01D 5/08* (2006.01)
*F01D 5/18* (2006.01)

(52) U.S. Cl.
USPC .......... 416/97 R; 416/95; 416/97 A; 415/115; 29/889.21; 29/889.22

(58) Field of Classification Search
USPC ................ 416/95, 96 R, 97 R; 415/115
See application file for complete search history.

(56) References Cited

U.S. PATENT DOCUMENTS

| | | | | |
|---|---|---|---|---|
| 3,816,272 A | * | 6/1974 | Joslin | 205/672 |
| 3,849,272 A | * | 11/1974 | Zubak | 205/642 |
| 5,413,463 A | * | 5/1995 | Chiu et al. | 416/95 |
| 5,924,843 A | | 7/1999 | Staub et al. | |
| 6,186,741 B1 | * | 2/2001 | Webb et al. | 416/96 R |
| 6,254,347 B1 | | 7/2001 | Shaw et al. | |
| 6,416,283 B1 | | 7/2002 | Johnson et al. | |
| 6,539,627 B2 | | 4/2003 | Fleck | |
| 6,582,584 B2 | | 6/2003 | Lee et al. | |
| 6,743,350 B2 | | 6/2004 | Lee et al. | |
| 6,824,360 B2 | | 11/2004 | Fleck | |
| 6,910,864 B2 | | 6/2005 | Tomberg | |
| 6,997,675 B2 | | 2/2006 | Dube et al. | |
| 6,997,679 B2 | | 2/2006 | Beddard et al. | |
| 7,114,916 B2 | | 10/2006 | Dube et al. | |
| 7,189,060 B2 | * | 3/2007 | Liang | 416/97 R |
| 7,377,746 B2 | * | 5/2008 | Brassfield et al. | 416/97 R |
| 2005/0158174 A1 | * | 7/2005 | Brooks et al. | 416/97 R |
| 2005/0175453 A1 | | 8/2005 | Dube et al. | |

FOREIGN PATENT DOCUMENTS

EP 207799 A2 * 1/1987

* cited by examiner

*Primary Examiner* — Igor Kershteyn
(74) *Attorney, Agent, or Firm* — Kinney & Lange, P.A.

(57) ABSTRACT

Contaminant build-up and cooling airflow looses are reduced in a turbine airfoil by joining root and airfoil cooling air passages thereof with a transition passage.

18 Claims, 3 Drawing Sheets

MINIMIZATION OF FOULING AND FLUID LOSSES IN TURBINE AIRFOILS

BACKGROUND OF THE INVENTION

1. Technical Field

This invention relates generally to gas turbine engines and particularly to the minimization of the fouling of, and minimization of fluid losses within the cooling air passages of turbine airfoils.

2. Background Art

The operation of gas turbine engines is well known. Such engines include a serial arrangement of a fan, a compressor, a combustor and a turbine. Air admitted into the inlet of the engine is compressed by the engine's compressor. The compressed air is then mixed with fuel in the engine's combustor and burned. The high-energy products of combustion of the burned air-fuel mixture then enter the turbine which extracts energy therefrom, in order to drive the compressor and. fan. That energy extracted by the turbine above and beyond that which is necessary to drive the compressor and fan exits the engine at the core engine exhaust nozzle thereof, producing thrust which may power an associated aircraft or operate a free turbine which drives an electrical generator, pump or the like.

A modern gas turbine engine operates at temperatures approaching 3000° F. Accordingly, it is a common practice to cool various components employed in such engines with air provided by the engine's compressor. Perhaps the most critical components to cool with compressor air are the first, and sometimes second stage turbine blades and vanes which are exposed to products of combustion at the exit of the engine's combustor.

It is well known to provide such compressor discharge cooling air to first stage turbine blades and vanes by routing such air through passages internally of a root and subsequently, an airfoil portion thereof. Such passages may be cast into the airfoil portions or, in the case of many large, industrial gas turbine engines, drilled into the blades or vanes by mechanical or electrochemical machining processes. In large industrial gas turbine engines, such cooling air passages often take the form of a series of generally radial holes extending through the entire blade or vane from the root to the tip thereof. Due to the complex shape of such airfoils resulting from curvature and camber of the airfoil portions thereof, as well as the relatively complex dovetail shape of the root portions thereof, it is often impossible to form the cooling air passages by a single drilling operation from root to tip. In most cases, two drilling operations are required for each passage. A first drilling operation forms a first portion of the passages (hereinafter referred to as the root passage) between the root end and a location often in the vicinity of the platform or inner shroud. A second drilling operation forms a second portion of the passage (referred to hereinafter as the airfoil passage) between the tip of the airfoil and the inner end of the root passage.

Since the root portion of the blade is not directly exposed to the hot engine combustion gases as is the airfoil portion, the heat load on the root portion is much less than that of the airfoil portion and thus, the cooling airflow velocities in the root need not be as great as those in the airfoil portion. This heat load characteristic of the blade, coupled with the requirement that the root cooling air passages supply a relatively large volumetric flow of cooling air to the airfoil passages, results in the root passages in most cases being considerably larger in flow area than the airfoil passages. In prior art blades, this difference in flow areas between the root and airfoil passages results in a relatively sharp inside passage corner at the periphery of the inner end of the root passage and a relatively sharp outside corner at the juncture of the airfoil and root passages. It has been observed that contaminants such as fine particulate matter present in the compressor discharge cooling air or combustion gases which may leak into the cooling air passages and contaminants dislodged from the passage walls during the cleaning thereof in the normal periodic maintenance of the gas turbine engine, will, over time, build up in these corner regions and eventually result in partial and sometimes complete blockage of the cooling air passage, resulting in overheating and possible burnout of the blade.

DISCLOSURE OF INVENTION

In accordance with the present invention, a cooling air passage extending through the root section of a turbine airfoil is joined to a cooling air passage extending through the airfoil shaped section of a turbine airfoil to mitigate against the build-up of foreign matter at what would otherwise be sharp corners defined by the direct connection of such passages. The transition section may fair at one end thereof into a larger flow area root passage and at an opposite end into a smaller diameter airfoil passage thereby eliminating the sharp corner regions described hereinabove and the associated contaminant buildup and overheating in those regions resulting therefrom. The transition section may be generally frustroconical in shape whereby the sharp (right) angular regions at the juncture of the root and airfoil passages are expanded to a range of generally 120° to 150°. Also, the length of the transition section may be generally 1.7 times the difference in radii between the larger and smaller passages when such passages are circular in cross section.

The arrangement of the exemplary embodiment hereof, lends itself to turbine blades or vanes in which the cooling air passages are electrochemically drilled. Typically, in such blades, the larger flow area (usually root) cooling air passages are electrochemically drilled from the root end of the blade or an interior portion thereof. Then, the smaller (usually airfoil) cooling air passages are electrochemically drilled from the tip of the blade to the interior termination of the larger diameter root cooling air passage. Finally, an electrochemical drill bit in the general shape of the transition section is inserted in the larger flow area passage and the transition section is formed at the juncture of the larger and smaller passages to form the transition section. Of course, prior art blades and vanes having the aforementioned sharp corners at the juncture of the root and airfoil cooling air passages can be improved by forming the transition passage at the juncture of the original root and airfoil passages.

DETAILED DESCRIPTION OF THE INVENTION

Figure 1:
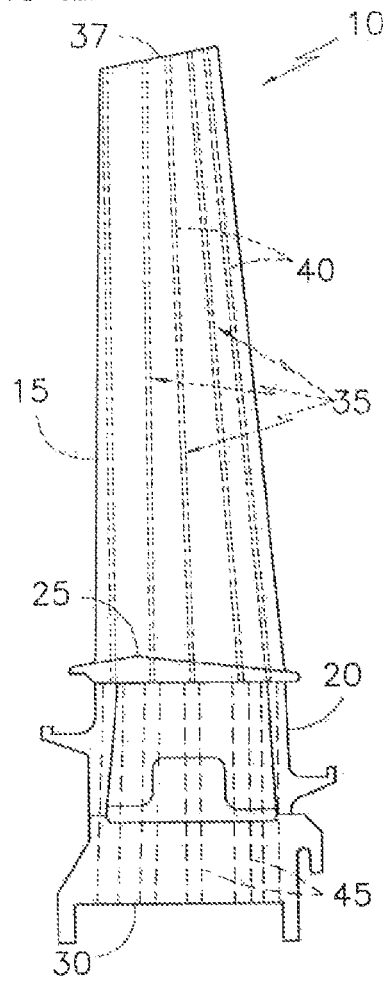
FIG. 1 is a side elevation of a prior art gas turbine engine turbine blade of the type for which the present invention is adapted.

Referring to FIG. 1, there is shown a typical turbine blade 10 for a gas turbine engine such as a first stage turbine blade for various well-known industrial gas turbine engines. The blade comprises an airfoil portion 15 which captures the energy of the working fluid (combustion gases) flowing thereover, to impart movement to a disk (not shown) on which the blade is mounted, and root portion 20 which provides a mount such as a well-known dovetail or fir tree mount to the disk. The airfoil and root portions are bound at an interior portion of the blade by a platform 25 which defines the radially inner boundary of the flow path of the working fluid through the turbine. The blade may be formed from any suitable material such as any known nickel based superalloys.

As set forth hereinabove, blade 10 is typically cooled by cooling air bled off the engine's compressor (not shown). The cooling air is typically fed into the root end 30 of the blade, passes through the blade in a generally radially outward direction and exits the blade at the radially outer tip end 35 thereof.

While there are many known arrangements of cooling passages for channeling cooling air through turbine blades, one of the most popular arrangements, particularly for large industrial gas turbine engines, is a plurality of generally radially extending cooling passages extending from the root and to the tip of blade 10. Still referring to FIG. 1, blade 10 is provided with a plurality of generally radially extending cooling air passages 35 which extend from the root end to the tip of the blades cooling air entering the cooling air passages at the root end, traversing the passages in a generally radial direction and exiting the blade at tip 35.

As set forth hereinabove, due to the rather complex shape of the airfoil and root portions 15 and 20, it is often necessary to form each cooling air passage from two generally straight sections, one (40) extending through a substantial portion of the airfoil portion of the blade and the other (45) extending through a substantial portion of the root portion of the blade. The two straight sections intersect somewhere at a medial location on the blade such as at the generally radial location of the platform as illustrated in FIG. 1. To accommodate the relatively high volumetric flow rates of cooling air required to cool blade 10, root passages 45 are of a larger flow area than airfoil passages 40 which have a smaller flow area to accelerate the cooling air flow sufficiently to achieve the required amount of convective heat transfer from the airfoil portion 15 of the blade into the cooling air passages 35.

Figure 2:
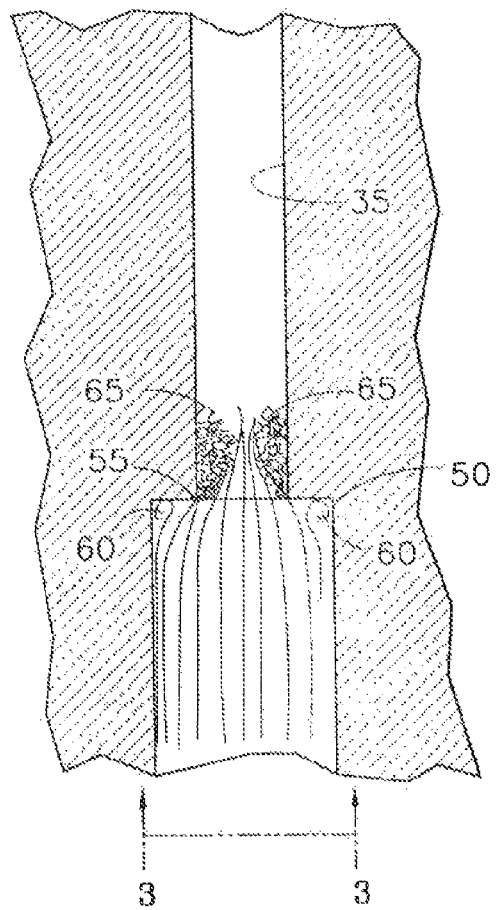
FIG. 2 is an enlarged fragmentary sectional view of a prior art juncture of root and airfoil cooling air passages of the blade shown in FIG. 1.

Referring to FIG. 2, it will be seen that the juncture of prior art root passage sections 45 and airfoil passage sections 40 define outside corners 50 and inside corners 55 due to the difference in flow areas of these passage sections. As a result of qualitative testing of engine blades such as that illustrated herein, it has been determined that a stagnation (low flow) region 60 is established in root passage 45 adjacent outside corner 50 and a highly turbulent region 65 is established in airfoil passage 35, just downstream from inside corner 55.

Figure 3:
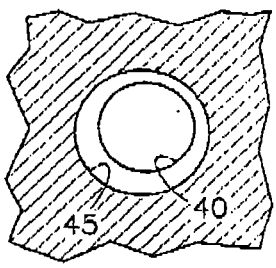
FIGS. 3, 4 and 5 are bottom views taken in the direction of line 3-3 in FIG. 2 of the cooling air passage juncture of FIG. 2 illustrating various levels of contaminant fouling thereof.
Figure 4:
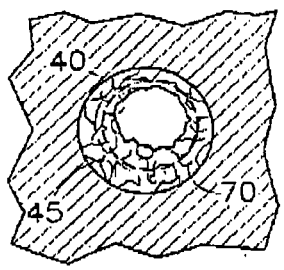
Figure 5:
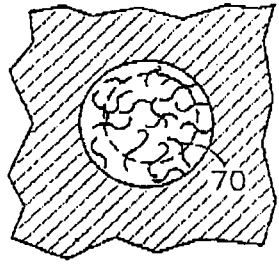

Observation of operational gas turbine engines has shown that foreign matter (contaminants) such as particulate matter entrained in the compressor discharge cooling air as well as foreign matter breaking free from the passage sidewalls during the aqueous cleaning of the cooling passages, builds up over time as the engine operates and reduces the flow area of the opening from the root passage to the airfoil passage. As shown in FIGS. 3-5 in a new blade (FIG. 3), the flow area at the juncture of the root and airfoil passage sections is fully open allowing unrestricted flow of cooling air therethrough. A build up of contaminants 70 in regions 60 and 65 reduces the effective flow area of the juncture of the root and airfoil passages. Finally, as illustrated in FIG. 5, continuous build up of contaminants will under some circumstances completely block the juncture of the cooling passages with contaminant build up 70, resulting in unacceptable thermo-mechanical fatigue and possibly burnout (failure) of blade 10.

The present invention minimizes the effect of the transition from a relatively larger flow area root passage to a relatively smaller flow area airfoil passage by minimizing the boundary layer build-up due to the discontinuities (corners 50 and 55) at the juncture of these two passages, it having been recognized that the boundary layer build-up results in lower flow velocities in regions 60 and 65. Such lower flow velocities in those two regions diminish the cooling air flow's capacity to carry away contaminants which tend to build up in those regions, through the cooling air passages and out into the main engine working fluid flow path through the blade tip.

Figure 6:
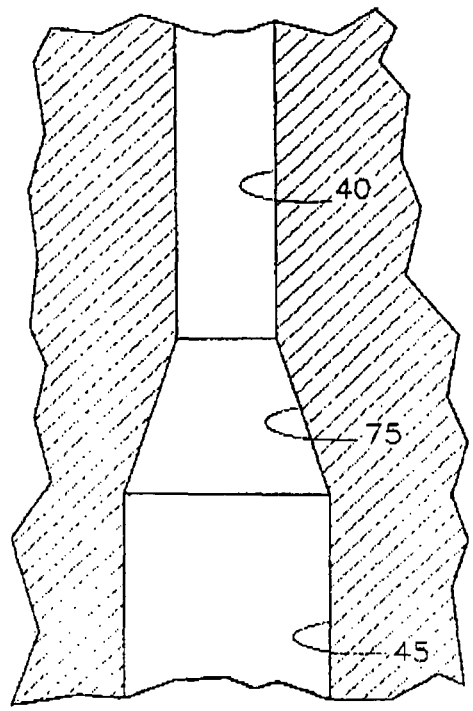
FIG. 6 is an enlarged fragmentary, sectional view of an arrangement root and airfoil cooling air passages in accordance with an embodiment of the present invention for minimizing contaminant fouling of the juncture of the root and airfoil cooling passages of a turbine blade of the type illustrated in FIG. 1.

Referring to FIG. 6, instead of adjacent ends of the root and airfoil passages being directly joined to one another, these passages join together at opposite ends of a transition passage 75 disposed therebetween, which reduces the thickness of the cooling air boundary layer at the juncture of the root and airfoil cooling air passages. This not only minimizes the tendency of contaminants to build up at the juncture of the root and airfoil passages, but also reduces flow losses thereat for more effective convection cooling of the blade. In the embodiment shown in FIG. 6, transition passage 75 is generally frustro-conical in shape and fairs into the root and airfoil passages at opposite ends of the transition passage. Of course, the size and shape of the ends of the transition passage will match the size and shape of the root and airfoil passages. Although the longer the transition passage, the less the discontinuity at the juncture of the root and airfoil passages, it has been determined that a sufficient reduction in boundary layer thickness to minimize the build up of contaminants and aerosol particles is achieved with a transition passage having a length 1.7 times the ratio of the difference in radii between the root and airfoil passages.

Figure 7:
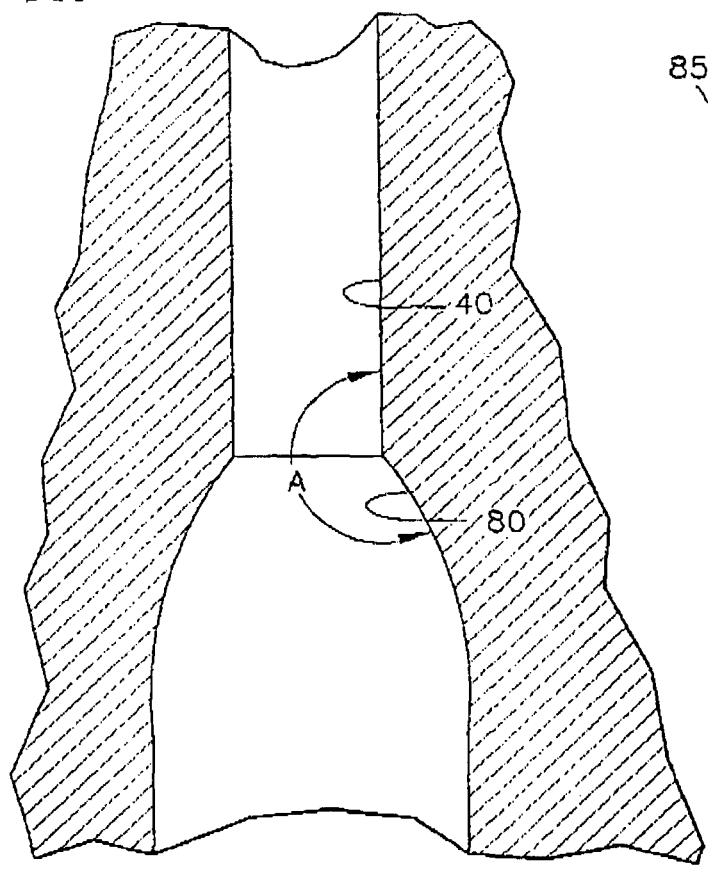
FIG. 7 is an enlarged fragmentary sectional view of an alternate embodiment of an arrangement of root and airfoil cooling air passage in accordance with the present invention.

Referring to FIG. 7, an alternate embodiment 80 of the transition passage is shown having a generally parabolic or bullet shape. As illustrated, the radially outer end of the transition passage joins the radially inner end of the airfoil passage 40 such that the walls of the two passages define an angle A which is less than 270°. The walls of the transition passage, at the opposite end thereof, join the walls of the root passage at a smooth (straight) 180° angle. From the radially inner end of airfoil passage 40, the slope of the transition passage with respect to the parallel walls of the airfoil and root passages gradually decreases to zero where the transition passage wall joins the root passage wall.

Figure 8:
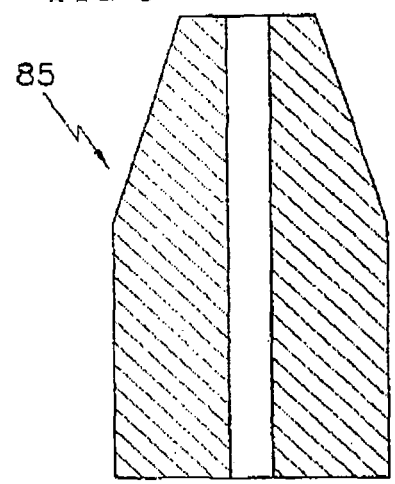
FIG. 8 is an enlarged side elevation of an electrochemical-drilling tool employed to form the arrangement of cooling air passages shown in FIG. 6.
Figure 9:
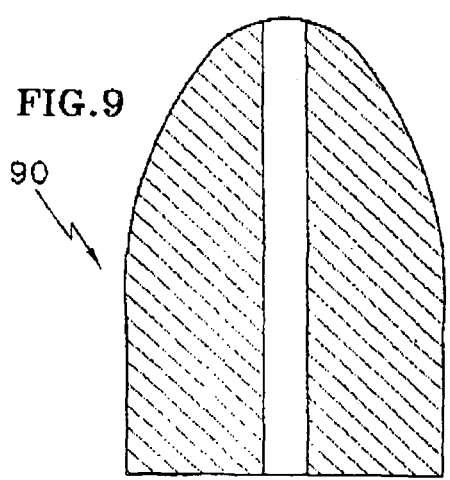
FIG. 9 is an enlarged side elevation of an electrochemical-drilling tool employed to form the arrangement of cooling air passages shown in FIG. 8.

The arrangement of cooling air passages described herein may be formed by any known manufacturing techniques. However, this arrangement is particularly well suited for manufacture by electrochemical drilling techniques, wherein the radial cooling passages are formed by flowing an electrolyte around an electrode and selectively electrolytically dissolving the blade or vane material at the desired locations to form the cooling passages. FIG. 8 discloses an electrochemical drilling electrode 85 for forming the frustoconically-shaped transition passage shown in FIG. 6 and FIG. 9 discloses an electrochemical drilling electrode 90 for forming the parabolic-shaped transition passage shown in FIG. 7. Each electrode is provided with a central passage 95 to accommodate the flow of electrolyte therethrough.

As set forth hereinabove, the provision of a transition passage at the juncture of cooling air passages of differing flow areas effects a reduction in boundary layer thickness both upstream and downstream of the juncture. Such a reduction in boundary layer thickness reduces the tendency of foreign matter to build up and choke off the flow of cooling air through the junctures. Since the boundary layer thickness is reduced, flow energy losses associated with such boundary layers are also reduced and the convective cooling of the blade is enhanced.

While particular embodiments of the present invention have been shown and described, it will be appreciated that various alternate embodiments will suggest themselves to those skilled in the art. Thus, while the present invention has been described within the context of a turbine blade, the invention is equally well suited for use in turbine vanes. As such, it is intended that the term "turbine airfoil" as used in the appended claims applies to turbine vanes as well as blades. Furthermore, while the invention hereof is illustrated and described for a blade having airfoil passages which are smaller in flow area than the adjoining root passages, it will be understood that this invention is also well suited for blades or vanes wherein the root passages have smaller flow areas than the airfoil passages. Moreover, the invention is applicable to cooling air passage of any cross-sectional shape. Furthermore, while the root and airfoil cooling air passages have been described and illustrated as joining the transition passage at the radial vicinity of the blade's platform, it will be understood that such juncture (and thus the location of the transition passage) vary radially from the vicinity of the platform. Accordingly, it is intended by the following claims to cover these and any other embodiments which fall within true spirit and scope of this invention.

Having thus described the invention, what is claimed is:

1. A turbine airfoil having a root end and a tip end comprising:
    a root portion having at least one first cooling air passage extending through a substantial portion thereof, said cooling air passage having a first flow area;
    an airfoil shaped portion having at least one second cooling air passage having a second flow area extending through a substantial portion thereof;
    a platform joining the root portion and the airfoil shaped portion at a medial location between the root end and the tip end;
    adjacent ends of said root and cooling air passages being joined at an elongated transition passage disposed across the area of the platform; said elongated transition passage being symmetric between the first cooling air passage and the second cooling air passage.

2. The turbine airfoil of claim 1 wherein said first and second cooling air passages and said transition passage are defined by sidewall structures, said airfoil and transition passage sidewalls intersecting at an angle substantially less than 270° and said root and transition passage sidewalls intersecting at an angle substantially greater than 90°.

3. The turbine airfoil of claim 1 wherein said elongated transition passage fairs into said root cooling air passage.

4. The turbine airfoil of claim 1 wherein said turbine airfoil is a blade.

5. The turbine airfoil of claim 1 wherein said first flow area is greater than said second flow area.

6. The turbine airfoil of claim 5 wherein said transition passage is generally frusto-conical in shape.

7. The turbine airfoil of claim 6 wherein the length of the transition passage is generally 1.7 times the difference in cross-sectional radii of the airfoil and root cooling air passages.

8. The turbine airfoil of claim 5 wherein said transition passage comprises a lateral sidewall of decreasing slope along the length thereof from the end thereof joined to said airfoil cooling air passage to the end thereof joined to said root cooling air passage.

9. The turbine airfoil of claim 1 wherein said transition passage comprises:
    a frustoconical sidewall having:
        a first end joined to a first sidewall of the first cooling air passage at a first inflection point to define a first angle between the first sidewall and the frustoconical sidewall; and
        a second end joined to a second sidewall of the second cooling air passage at a second inflection point to define a second angle between the second sidewall and the frustoconical sidewall.

10. The turbine airfoil of claim 1 wherein said transition passage comprises:
    a first large diameter end smoothly joined to the first cooling air passage;
    a second small diameter end joined to the second cooling passage at an inflection point; and
    a parabolic sidewall extending arcuately between the first large diameter end and the inflection point.

11. A method of forming a continuous cooling air passage in a turbine airfoil, having a root portion and an airfoil shaped portion, said method comprising:
    forming a first cooling air passage having a first diameter in a root portion of said turbine airfoil;
    forming a second cooling air passage having a second diameter in an airfoil shaped portion of said turbine airfoil as a longitudinal extension of said root cooling air passage; and
    forming an elongated transition passage at the juncture of said root and airfoil cooling passages so as to extend into both the root portion and the airfoil shaped portion of said turbine airfoil, said transition passage tapering down in cross-sectional area from the larger of said cooling air passage diameters to the smaller thereof to form an inflection point that abruptly changes an angle between the first cooling air passage and the second cooling air passage;
    wherein the elongated transition passage is formed using an electrochemical drilling electrode having a shape of the elongated transition passage between the first cooling air passage and the second cooling air passage.

12. The method of claim 11 wherein said transition passage is formed subsequent to the formation of both said root portion and airfoil portion cooling air passages.

13. The method of claim 12 wherein said root portion cooling air passage is formed prior to said airfoil portion cooling air passage.

14. The method of claim 11 wherein said root portion cooling air passage has a larger cross-sectional area than said airfoil cooling air passage.

15. The method of claim 11 wherein said transition passage is generally frustoconical in shape.

16. The method of claim 14 wherein said transition passage has a lateral sidewall which increases in slope along the length thereof from the juncture thereof with said root cooling air passage to the juncture thereof with said airfoil cooling air passage.

17. The method of claim 11 wherein the shape of the transition passage comprises:
  a frustoconical wall having:
    a first end joined to the first cooling air passage at a first inflection point to define a first angle between the first cooling air passage and the frustoconical wall; and
    a second end joined to the second cooling air passage at a second inflection point to define a second angle between the second cooling air passage and the frustoconical wall.

18. The method of claim 11 wherein the shape of the transition passage comprises:
  a first large diameter end smoothly joined to the first cooling air passage;
  a second small diameter end joined to the second cooling passage at an inflection point; and
  a parabolic sidewall extending arcuately between the first large diameter end and the inflection point.

* * * * *

UNITED STATES PATENT AND TRADEMARK OFFICE
CERTIFICATE OF CORRECTION

PATENT NO. : 8,511,992 B2  
APPLICATION NO. : 12/009714  
DATED : August 20, 2013  
INVENTOR(S) : Matthew T. Dahmer and Alexander V. Staroselsky It is certified that error appears in the above-identified patent and that said Letters Patent is hereby corrected as shown below:

In the Specification

Col. 1, Line 19
   Delete "." – after "compressor and"

Signed and Sealed this
Twenty-eighth Day of January, 2014

Michelle K. Lee
*Deputy Director of the United States Patent and Trademark Office*